(12) United States Patent
Kim et al.

(10) Patent No.: US 11,609,478 B2
(45) Date of Patent: Mar. 21, 2023

(54) SYSTEMS AND METHODS FOR ALIGNMENT OF PHOTONIC INTEGRATED CIRCUITS AND PRINTED OPTICAL BOARDS

(71) Applicant: Hirose Electric Co., Ltd., Kanagawa (JP)

(72) Inventors: Kihong Kim, San Jose, CA (US); Jeremy Buan, San Jose, CA (US); Tsutomu Matsuo, Tokyo (JP); Tadashi Ohshida, Cupertino, CA (US)

(73) Assignee: Hirose Electric Co., Ltd., Kanagawa (JP)

( * ) Notice: Subject to any disclaimer, the term of this patent is extended or adjusted under 35 U.S.C. 154(b) by 2 days.

(21) Appl. No.: 17/331,534

(22) Filed: May 26, 2021

(65) Prior Publication Data

US 2021/0389642 A1 Dec. 16, 2021

Related U.S. Application Data

(60) Provisional application No. 63/038,004, filed on Jun. 11, 2020.

(51) Int. Cl.
*G02F 1/295* (2006.01)
*G02B 6/42* (2006.01)
*G02F 1/335* (2006.01)

(52) U.S. Cl.
CPC ........... *G02F 1/295* (2013.01); *G02B 6/4225* (2013.01); *G02F 1/335* (2013.01); *G02F 2203/10* (2013.01)

(58) Field of Classification Search
CPC ............... H05K 1/0274; H04B 10/801; H04B 10/803; G02B 6/422; G02B 6/4225; G02B 6/4226; G02B 6/4227; G02B 6/4234; G02F 1/29; G02F 1/291; G02F 1/292; G02F 1/295; G02F 1/2955; G02F 1/31; G02F 1/313
See application file for complete search history.

(56) References Cited

U.S. PATENT DOCUMENTS

| | | | |
|---|---|---|---|
| 2006/0091305 A1* | 5/2006 | Grunnet-Jepsen | G01D 5/35316 250/363.06 |
| 2015/0086149 A1* | 3/2015 | Zheng | G02F 1/025 385/2 |
| 2016/0142156 A1* | 5/2016 | Hwang | H04B 10/1143 398/128 |
| 2017/0279537 A1* | 9/2017 | Kim | H04B 10/572 |

* cited by examiner

*Primary Examiner* — Michael Stahl
(74) *Attorney, Agent, or Firm* — Procopio, Cory, Hargreaves & Savitch LLP

(57) ABSTRACT

Example implementations described herein are directed to an interface configured to redirect light between a connector connected to a printed optical board (POB) via an optical waveguide, and a photonic integrated circuit (PIC), the interface involving two-dimensionally distributed waveplates (TDWs) having multiple layers of p-doped and n-doped silicon, the TDWs configured to be driven to change a dielectric constant at a two dimensional location on the TDWs such that the received light is redirected at the two dimensional location.

19 Claims, 18 Drawing Sheets

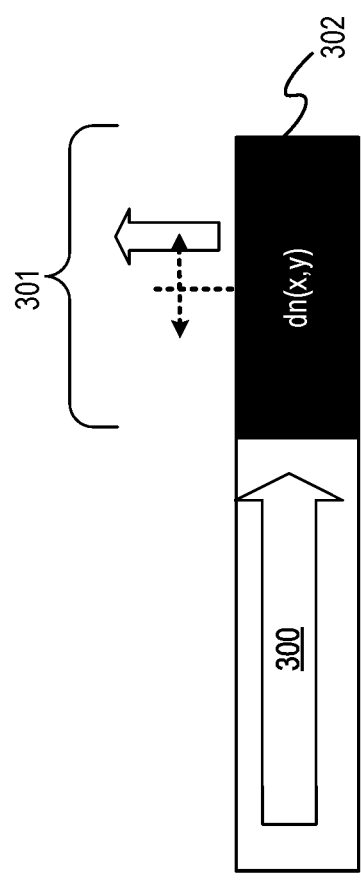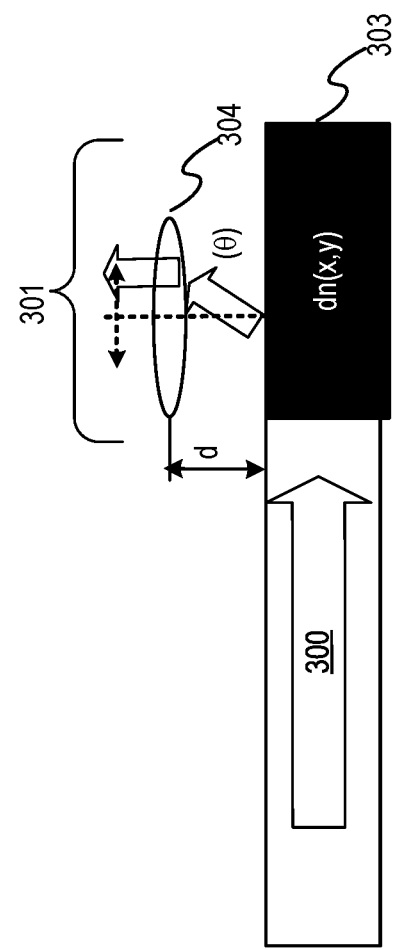
FIG. 3(a)
FIG. 3(b)

SYSTEMS AND METHODS FOR ALIGNMENT OF PHOTONIC INTEGRATED CIRCUITS AND PRINTED OPTICAL BOARDS

CROSS REFERENCE TO RELATED APPLICATIONS

This patent application is based on and claims the benefit of priority from provisional U.S. patent application No. 63/038,004, filed on Jun. 11, 2020, the disclosure of which is hereby incorporated by reference herein in its entirety for all purposes.

BACKGROUND

Field

The present disclosure is generally directed to electronic systems having photonic integrated circuits (PIC), and more specifically, to systems and methods for aligning the PIC with the printed optical board.

Related Art

There have been recent developments in electrical printed circuit boards having embedded optical waveguides to provide light to be converted into electrical signals and vice versa. Such systems are known as printed optical circuit boards, and are referred to herein referred to as printed optical boards (POBs).

In a system that has PIC on a POB which is referred to as 'PIC system' hereafter, as the copper traces of the PIC systems collapse towards zero, the optical connectors become crowded in the immediate vicinity of the System on Chip (SoC). Unfortunately, there are no optical Input/Output (I/O) standards for this crowded-bus environment. The input and output of PIC (equivalent to the I/O buffer and the bonding pad of electrical systems), also known as off-chip optical bus, do not have any candidate solutions, industry consensus, or standard activities. The lack of such solutions is a near-term challenge facing connector makers that are involved with PIC components.

There have been recent developments in the design of a printed optical board (POB) to involve embedded waveguides within the circuit board. FIG. 1 illustrates an example POB system. Specifically, FIG. 1 illustrates an optical waveguide core layer which is embedded in a printed circuit board (PCB) material and process. The arrows indicate directions of light paths from the optical modules to the SoC. Since the optical layer and the electrical layer are aligned in manufacturing, assembly houses do not need to provide extra alignment. However, the material system requires a new lamination process, which increases the cost and yields unknown field product reliability.

SUMMARY

Aspects of the present disclosure involve a system, involving an interface configured to redirect light from a connector facilitating single mode waveguide light from a printed optical board to a photonic integrated circuit (PIC), the interface having two-dimensionally distributed waveplates (TDWs) which could be composed of multiple layers of p-doped and n-doped silicon as an example. In general, the TDWs are configured to be driven to change a dielectric constant at every two-dimensional location such that the light received through the waveguide from an internal functional IP block of the PIC is redirected at the two-dimensional location.

Aspects of the present disclosure involve a system configured to redirect light between a connector connected to a printed optical board (POB) via an optical waveguide and a photonic integrated circuit (PIC) package, which can involve one or more two-dimensionally distributed waveplates (TDWs), each of the one or more TDWs having a plurality of layers of p-doped and n-doped silicon, the one or more TDWs configured to be driven to change a dielectric constant at a two-dimensional location on the one or more TDWs such that the light received at the one or more TDWs is redirected at the two-dimensional location towards a vertical grating coupler.

Aspects of the present disclosure involve a system, which can involve a connector configured to be connected to a printed optical board (POB) via an optical waveguide; a photonic integrated circuit (PIC) package; and one or more two-dimensionally distributed waveplates (TDWs) configured to redirect light between the POB and the PIC package, each of the one or more TDWs having a plurality of layers of p-doped and n-doped silicon, the one or more TDWs configured to be driven to change a dielectric constant at a two-dimensional location on the one or more TDWs such that the light received at the one or more TDWs is redirected at the two-dimensional location towards a vertical grating coupler.

BRIEF DESCRIPTION OF THE DRAWINGS

FIGS. 3(a) and 3(b) illustrate example configurations of the PIC interface involving TDWs with multiple layers in accordance with an example implementation.

DETAILED DESCRIPTION

Figure 1:
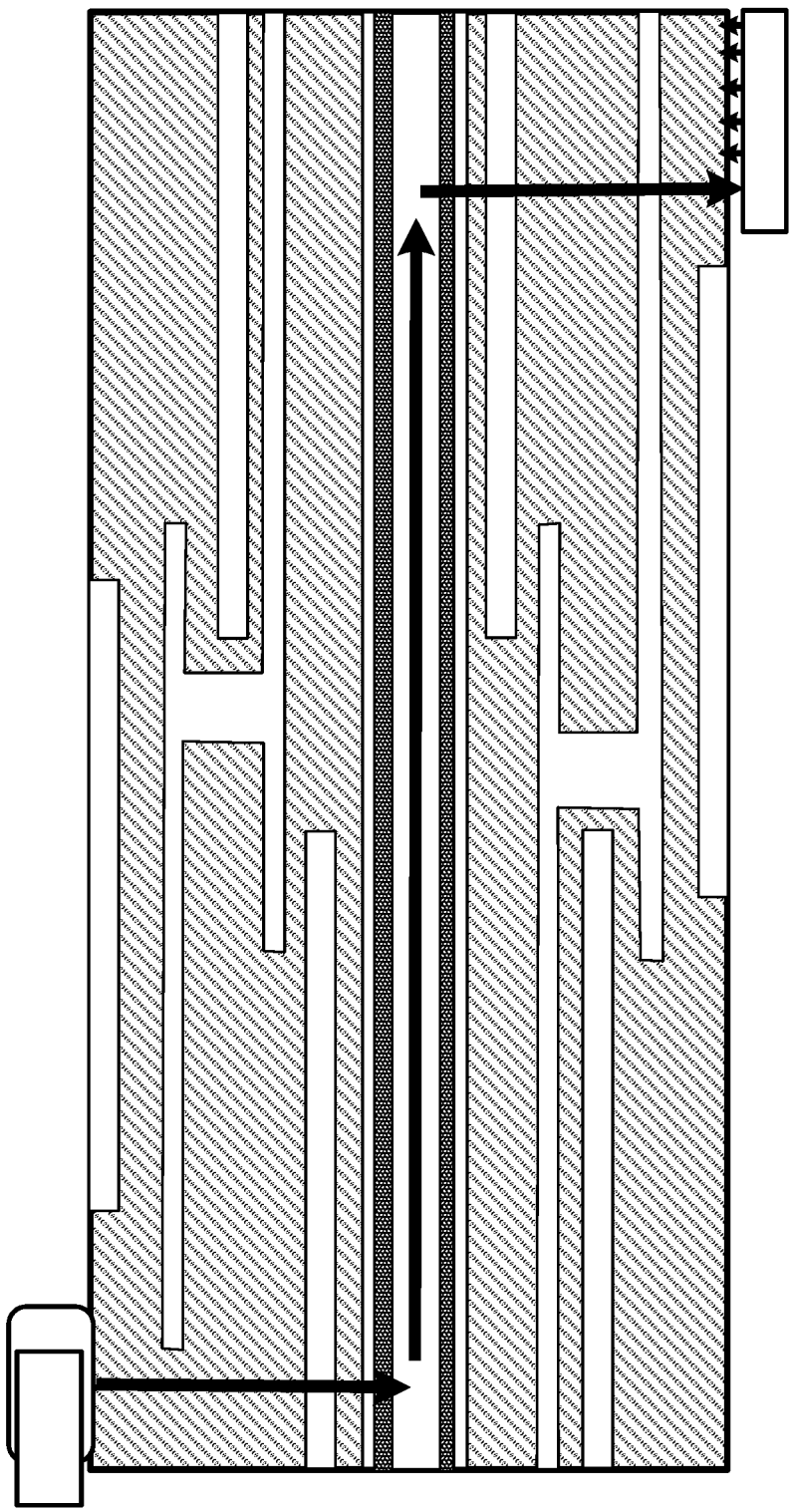
FIG. 1 illustrates an example Printed Optical Board (POB) system.

The following detailed description provides further details of the figures and example implementations of the present application. Reference numerals and descriptions of redundant elements between figures are omitted for clarity. Terms used throughout the description are provided as examples and are not intended to be limiting. Example implementations described herein may be used singularly, or in combination other example implementations described herein, or with any other desired implementation.

Example implementations described herein are generally directed to electronic systems involving a photonic integrated circuit (PIC) on a second level integration means such as an electrical printed circuit board with embedded optical waveguide, herein referred to as a printed optical board (POB). More specifically, example implementations are directed to such systems (called 'PIC system' hereafter) and methods for aligning the PIC with the printed optical board. PIC is a packaged electrooptic functional circuit that contains electrical integrated circuits and optical integrated circuits monolithically as a single chip or individually on a substrate as a multi-chip module.

In PIC systems involving POBs with embedded waveguides, optical connectors are needed to facilitate the interfaces between board to PIC, or between PIC and board depending on the desired displacement of the vertical grating coupler. Because the copper trace length will eventually become zero, the optical to electrical system and interfaces will be such that the chiplet will eventually be disposed right on the packaging so that PIC becomes a single chip that can handle both electronics and optics with incumbent electrical interfaces and the optical interfaces we described herein.

Figure 2:
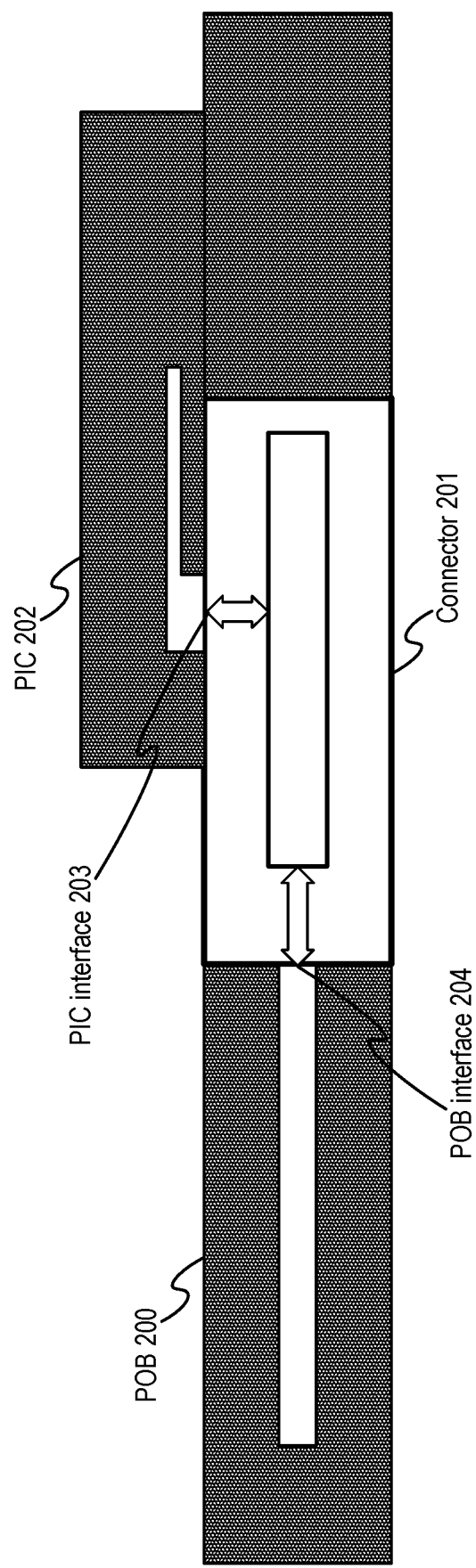
FIG. 2 illustrates an example system involving the POB and the PIC, in accordance with an example implementation.

FIG. 2 illustrates an example system involving the POB and the PIC, in accordance with an example implementation. The POB 200 and the PIC 202 are connected by a connector 201 that facilitates a chip to board connection. The PIC 202 is incorporated in an IC packaging which is bonded (e.g., wirebonding, electric bonding) to the POB 200. The connector 201 connects to the POB 200 through a POB interface 204 and connects to the PIC 202 through the PIC interface 203. In an example of the system, light is provided through the waveguides of the POB, or waveguide of the PIC 202 in the case of the signal flow in the opposite direction from the PIC to the waveguides of the POB.

In the manufacture of such systems, the PIC 202 is placed on the PIC interface 203. The undersurface of the PIC 202 involves a coupler that can involve absorptive portions and reflective portions, wherein the absorptive portions are configured to absorb the light directed at the PIC 202 from the connector 201, and the reflective portions are configured to reflect light back to the connector 201. Signal flow can also be reversed, wherein light is transferred from the PIC 202 to the POB 200, which is absorbed by the connector 201 and redirected through the single mode waveguide to the POB 200.

However, in the assembly of such systems, it can be difficult to determine the alignment of the absorptive portions of the PIC 202 with the PIC interface 203. In particular, light directed from the PIC interface 203 to the PIC can be lost with improper alignment. Further, realignment of the PIC 202 with the PIC interface 203 may be difficult to accomplish through mechanical adjustments as it can be difficult to tell where the light from the PIC interface 203 is directed to the PIC 202, or where the light directed from the PIC interface 203 is directed to the connector 202.

Example implementations address the above issue by introducing a PIC interface 203 that involves one or more two-dimensionally distributed waveplates (TDWs) having multiple layers that shapes and locates the incident light beam into the perpendicular output light beam between the two different media.

In example implementations described herein, the proposed PIC interface 203 with one or more TDWs are configured with an electrically controllable dielectric distribution function of a dielectric constant (d(x,y)), wherein (x,y) are pixelated coordinates on the TDW plate with pixels set according to the desired implementation and from through using 2D grating structures or metasurfaces depending on the desired implementation. In the examples provided herein, the (x,y) pixelated coordinates are formed as a checkerboard configuration based on the n-doped and p-doped silicon, however, other implementations may also be utilized in accordance with the desired implementation. Through such example implementations, incoming/outgoing light can constructively interfere to form a substantially orthogonal turn on an outgoing/incoming beam with the desired size and shape in a Gaussian waveform in free space or in waveguide.

In the example implementations described herein, the TDWs can involve a plurality of layers, each of which is separately defined by the associated distribution function of dielectric constant $d_n(x,y)$ (with n being the layer n=1, 2, . . . ). This sandwiched structure spatially interferes with the incoming light beam from the waveguide to fine tune the location and shape of the outgoing light beam to space such that overall channel performance reaches to the maximum target value, or with the incoming light beam from the space to fine tune the location and shape of the outgoing light beam to the waveguide such that overall channel performance reaches to the maximum target value.

In example implementations, bidirectionality between the PIC 202 and the PIC interface 203 is generally ensured by the reciprocity of the physical light path.

FIGS. 3(a) and 3(b) illustrate example configurations of the PIC interface involving one or more TDWs with multiple layers in accordance with an example implementation. As illustrated in FIGS. 3(a) and 3(b), light is directed through a waveguide 300 to the TDW 302, 303, which is configured to redirect the light beam into space 301.

In the example of FIG. 3(a), the outgoing beam center can be moved to any desired location (x,y) on the PIC interface 302 through electrical control of the 2D grating structures or metasurface of the TDW. In the example of FIG. 3(b), the PIC interface 303 involves a multiple-input and multiple-output (MIMO) implementation, and a lens 304 to compensate for PIC interfaces that have limited ranges to control for $d_n(x,y)$, since MIMO beam forming parameters involve the azimuthal and polar angle rather than (x,y) two-dimensional coordinates. The angle control of beam can locate the beam center at (d*sin(q)*cos(f),d*sin(q)sin(f)) where 'd' is the distance from the PIC interface to the aspheric lens. As such, the outgoing beam center can be moved to any desired location (x,y) through electrical control and aimed at the desired direction. In such example implementations, the PIC interface 303 is configured to orient the light beam at steering angle (θ) and angle (φ). The range to cover can be extended linearly by 'd', in accordance with the desired implementation.

Figure 4A:
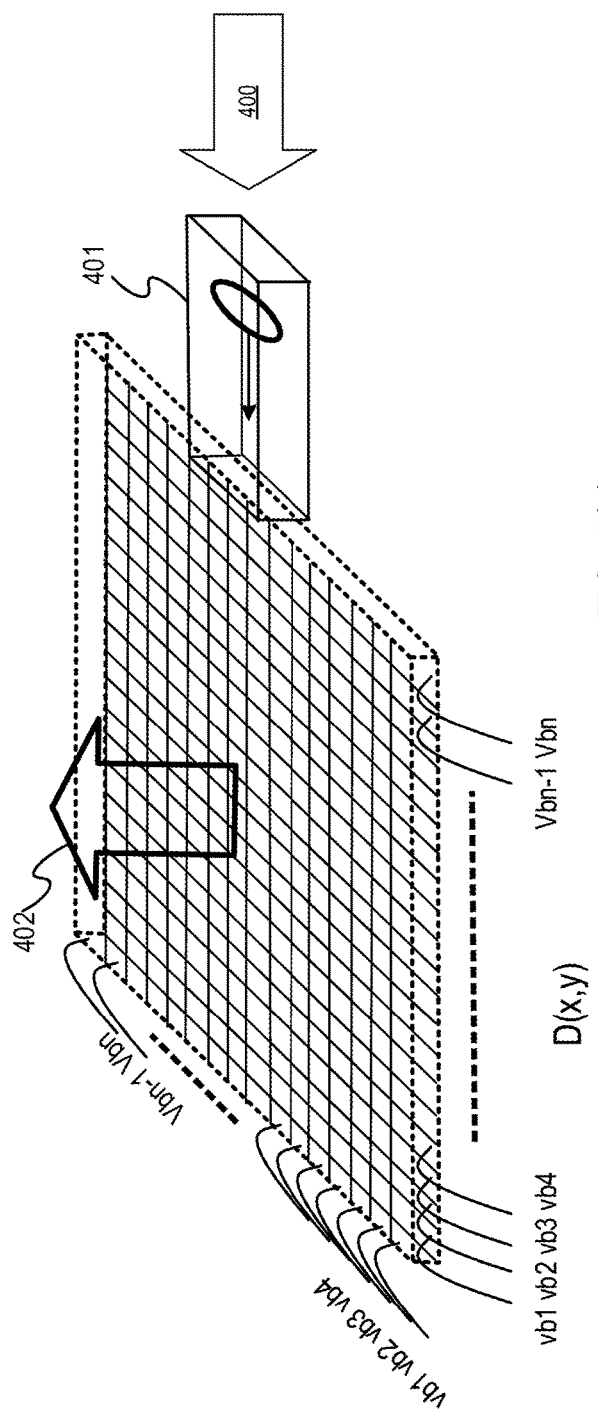
FIGS. 4(a) and 4(b) illustrate an example structure of a PIC interface involving TDWs, in accordance with an example implementation.
Figure 4B:
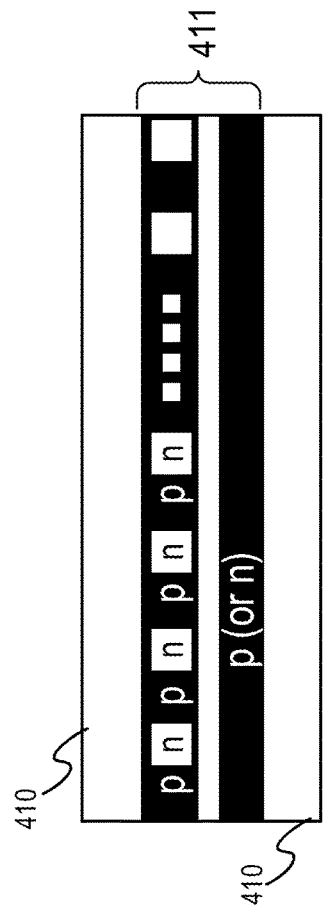

FIGS. 4(a) and 4(b) illustrate an example structure of a PIC interface involving TDWs, in accordance with an example implementation. As illustrated in FIG. 4(a), the multiple layers of the TDW are arranged in a pixelated fashion to facilitate a broadened and scattered right angle upward Gaussian beam 402 that is centered at an arbitrary location (x,y) among the TDW pixels based on adjustment of the dielectric constant. In example implementations, the reciprocity of the light path holds for the reverse direction.

As illustrated in FIG. 4(a), the TDW is connected to the PIC interface circuits through an optical waveguide 401 which facilitates single mode light 400 from the PIC interface circuits to the TDW layers. The optical waveguide 401 can facilitate light into the TDW with or without tapering depending on the desired implementation. Depending on the desired implementation, the optical waveguide 401 can be in the form of a single mode waveguide or a multi-mode waveguide.

To control the dielectric constant at each layer, the TDW is configured to be voltage driven along rows and columns of the layers as illustrated in FIG. 4(a). Through adjusting the voltage across each row and column, the voltage at particular pixels can be thereby controlled and the dielectric constant at a particular location (x,y) can thereby be adjusted according to the desired implementation. Through the adjusted dielectric constant, the light entering the TDW can be directed to either pass through adjacent pixels of the TDW, or redirected substantially orthogonally upward in accordance with the desired implementation.

Depending on the desired implementation, the TDW can be configured to be controlled by other methods besides voltage. For example, ultrasonic signals can also be used to adjust the dielectric constant. In another example, adjustments can be made on the surface plasmon polariton on electro-optic graphene structure in accordance with any desired implementation known in the art. Other methods to change the dielectric constant can also be utilized in accordance with the desired implementation, and the present disclosure is not limited thereto.

FIG. 4(b) illustrates an example cross section of the TDW, in accordance with an example implementation. The example cross section of FIG. 4(b) includes vertical grating couplers (VGCs) 410 that are fixed onto the PCB and have an optical path to the vertical line. Such VGCs can be composed of silicon dioxide or cladding, depending on the desired implementation, and can be any form of VGC as known in the art.

The middle layer 411 facilitates the optical light to the silicon surfaces, and can be composed of silicon, through which electrical connections are facilitated (e.g., chip to electrical board) and can also involve a core to facilitate an optical path to connect the POB. The middle layer 411 further includes a layer having a p-doped and n-doped silicon in the pixelated formation, as well as an underlying silicon layer that is either p-doped or n-doped.

Figure 5:
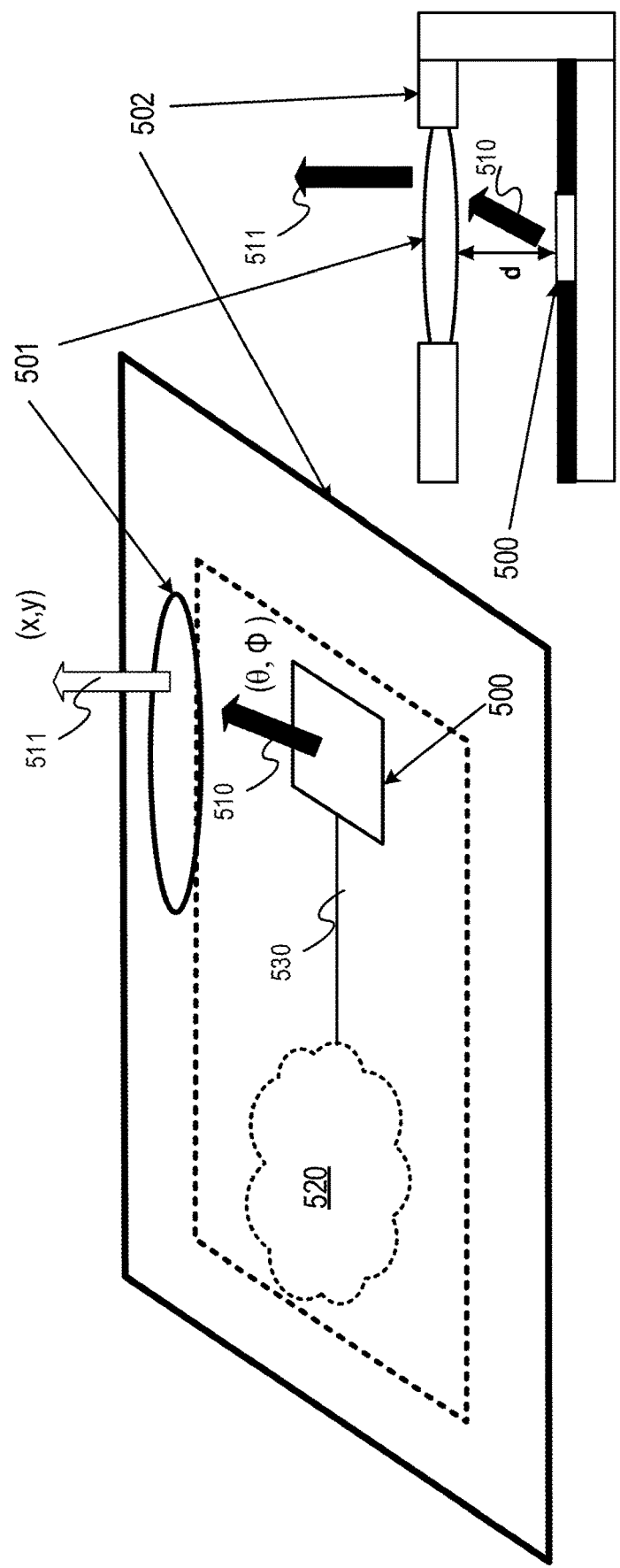
FIG. 5 illustrates an example implementation for a MIMO type implementation of the TDW with a lens, in accordance with an example implementation.

FIG. 5 illustrates an example implementation for a MIMO type implementation of the TDW with a lens 501, in accordance with an example implementation. In the example implementation of FIG. 5, the TDW 500 receives light through single mode waveguide 530 from PIC 520 and functions as a coherent optical MIMO, which is broadened and configured to form a Gaussian beam 510 with an arbitrary angle (θ, φ) direction, based on the dielectric constant d(x,y). Based on the desired angle, the beam 510 is processed by the collimator lens 501 to the desired location (x,y) at a distant plane.

Depending on the desired implementation, the lens 501 can be an aspheric lens made of glass or plastic. The lens 501 is configured to direct angled light into the desired location at a substantially orthogonal orientation. As illustrated in FIG. 5, the lens 501 can also be embedded in packaging 502.

Further, the signal flow can also be reversed back to the PIC 520 and the single mode waveguide 530 via through the lens 501 into the TDWs 500. In such a situation, the light flow is directed perpendicularly into the aspheric lens 510 from the PIC, which is redirected at an angle back towards the TDWs 500 (e.g., in the reverse direction of the arrows 510, 511 as illustrated in FIG. 5).

Figure 6A:
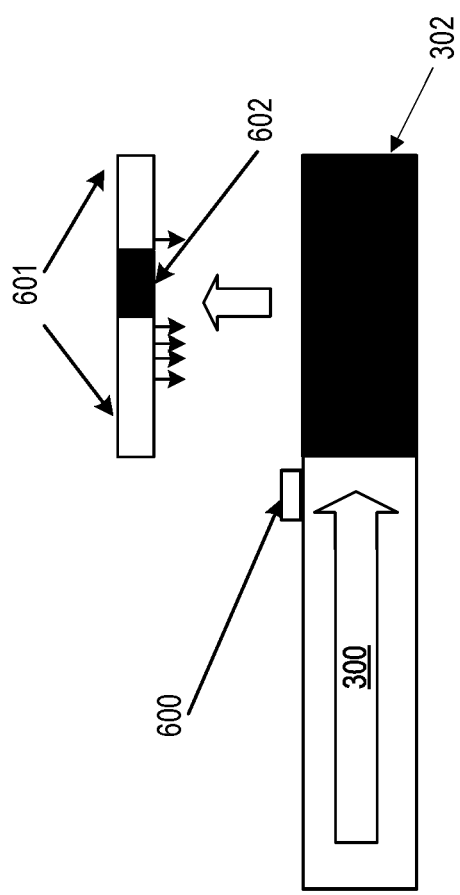
FIGS. 6(a) and 6(b) illustrates example configurations to determine the alignment between the PIC interface and the PIC, in accordance with the desired implementation.
Figure 6B:
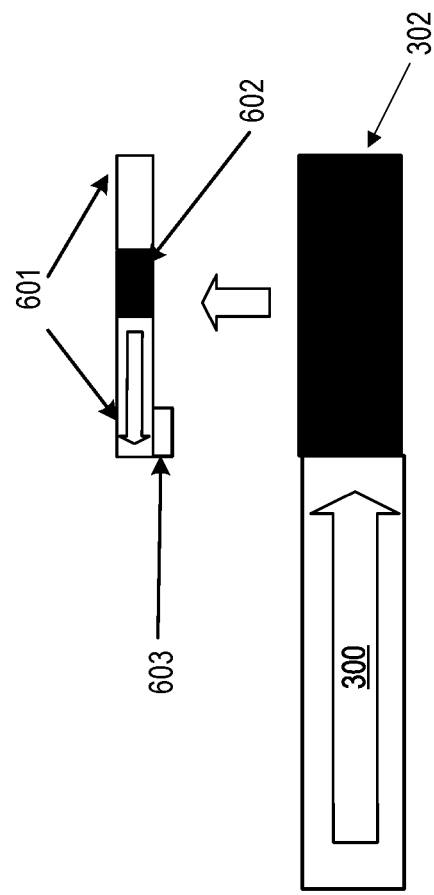

FIGS. 6(a) and 6(b) illustrates example configurations to determine the alignment between the PIC interface and the PIC, in accordance with the desired implementation.

In example implementations, there are various types of feedback mechanisms that can be employed depending on the sensor location in the light path. One example of a feedback mechanism is the reflective method, in which the sensor is located at the light source side so that the amount of the reflective signal indicates the amount of misalignment between the PIC and the interface. On the other hand, in another example feedback mechanism involves a transmissive method, in which the sensor(s) are located at the opposite side of the signal to be aligned so that the source and sensor pair are used to actively align the two optical components until maximum power is reached for the receiving element. FIG. 6(a) illustrate example configurations that can be utilized for a reflective method and 6(b) illustrate example configurations that can be utilized for a transmissive method.

In the example of FIG. 6(a), the target waveguide/PIC can involve reflective portions 601 that are adjacent to the target coupler 602. The target coupler 602 absorbs light directed towards it, whereas the reflective portions 601 reflect light directed towards them as shown by the arrows. The reflected light is used to serve as a reflection feedback signal, with the objective of obtaining the minimum value for the feedback signal. This reflection is monitored by a waveguide tap monitor with a photodiode sensor 600 attached to the PIC connector side. The reflective portions can be made of any material or can be any kind of coating that has reflective properties, and is not particularly limited thereto.

In the example of FIG. 6(b), the transmitted light is to serve as feedback against the maximum value of the light signal. This signal is monitored by a waveguide tap monitor with a photodiode sensor 603 attached to the target waveguide/PIC side. Through this waveguide tap monitor, the maximum signal value of the transmitted light from the PIC connector to the target waveguide/PIC side can thereby be known once aligned. Thus, through the use of photodiode sensors as illustrated in FIGS. 6(a) and 6(b), the alignment calibration can be known based on the measurements of the reflected light, and the TDWs can thereby be driven to change the dielectric constant accordingly, even when the PIC package is already bonded to the connector.

Through the use of the example implementations described herein, the PIC and interface to the POB can thereby be aligned correctly through dielectric constant adjustments on the TDWs of the interface. Thus, light can be redirected from the desired 2D coordinate location on the TDW in accordance with the desired implementation, even if the alignment was not optimal when the PIC was placed on the interface.

Further, through use of the photodiode sensors to measure reflected light as described herein, alignment can be determined based on the measurements of reflected light. Thus, even if the alignment is altered after assembly and alignment are completed, the measurements provided by the one or more photodiode sensors can be used to change the dielectric constant of the TDWs accordingly post assembly and post alignment to realign the PIC package to the connector.

Additionally, the use of a waveguide tap monitor with one or more photodiode sensors allows the measurement of signal as received by either the connector or the PIC package, depending on the desired implementation. Thus, even if the alignment is altered after assembly and alignment are completed, because the maximum signal value is known, the measurement of the waveguide tap monitor can be used to change the dielectric constant of the TDWs accordingly post assembly to realign the PIC package to the connector.

Although example implementations described herein are directed to the TDWs interface as provided on the connector or the POB, the TDWs interface can also be placed in the PIC to direct light onto the desired location of the POB surface. In such an example implementation, the lens of FIG. 5 can be configured to focus light beam to the desired location of the POB surface, where the beam angle normal to the TDWs is configured to be driven to change the dielectric constant at the two-dimensional location such that the light received from the connector is redirected at an angle from the interface to the lens at the two-dimensional location. Thus, the implementation of the TDWs can be disposed in the connector or in the PIC package in accordance with the desired implementation, with the other structural elements modified accordingly to facilitate such an implementation.

Figure 7A:
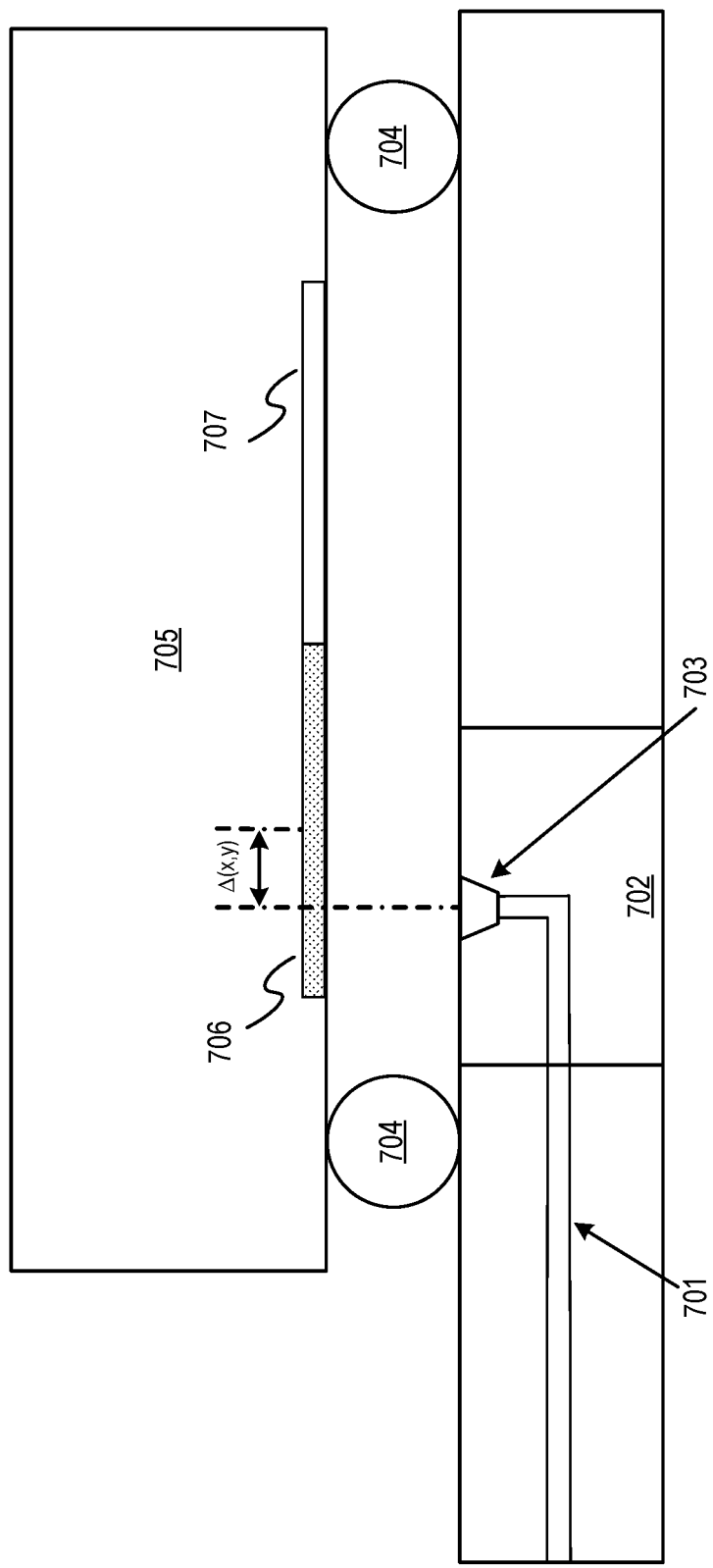
FIGS. 7(a) to 7(c) illustrate an example assembly of a TDW plate interface as incorporated on the PIC as part of the PIC package, in accordance with an example implementation.
Figure 7B:
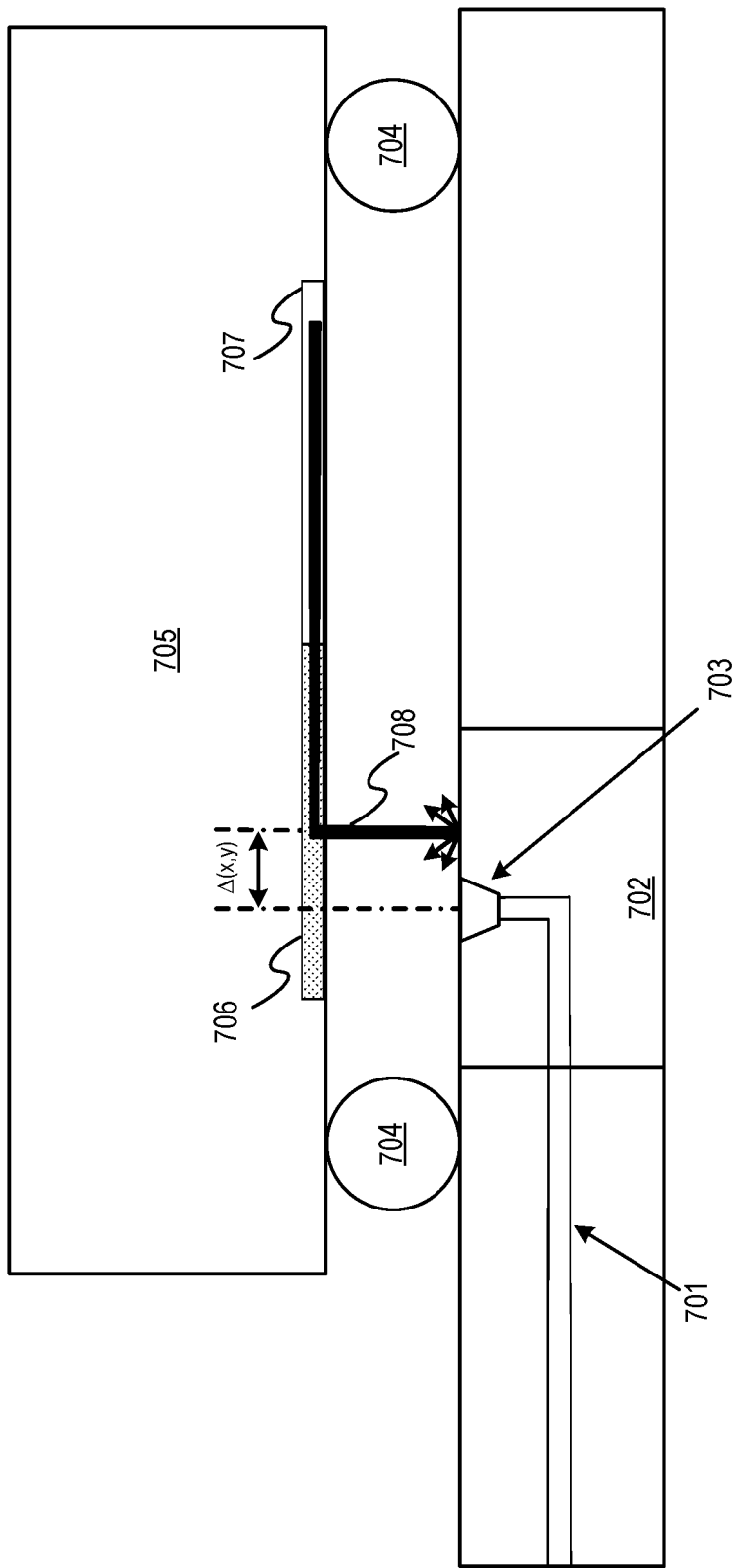
Figure 7C:
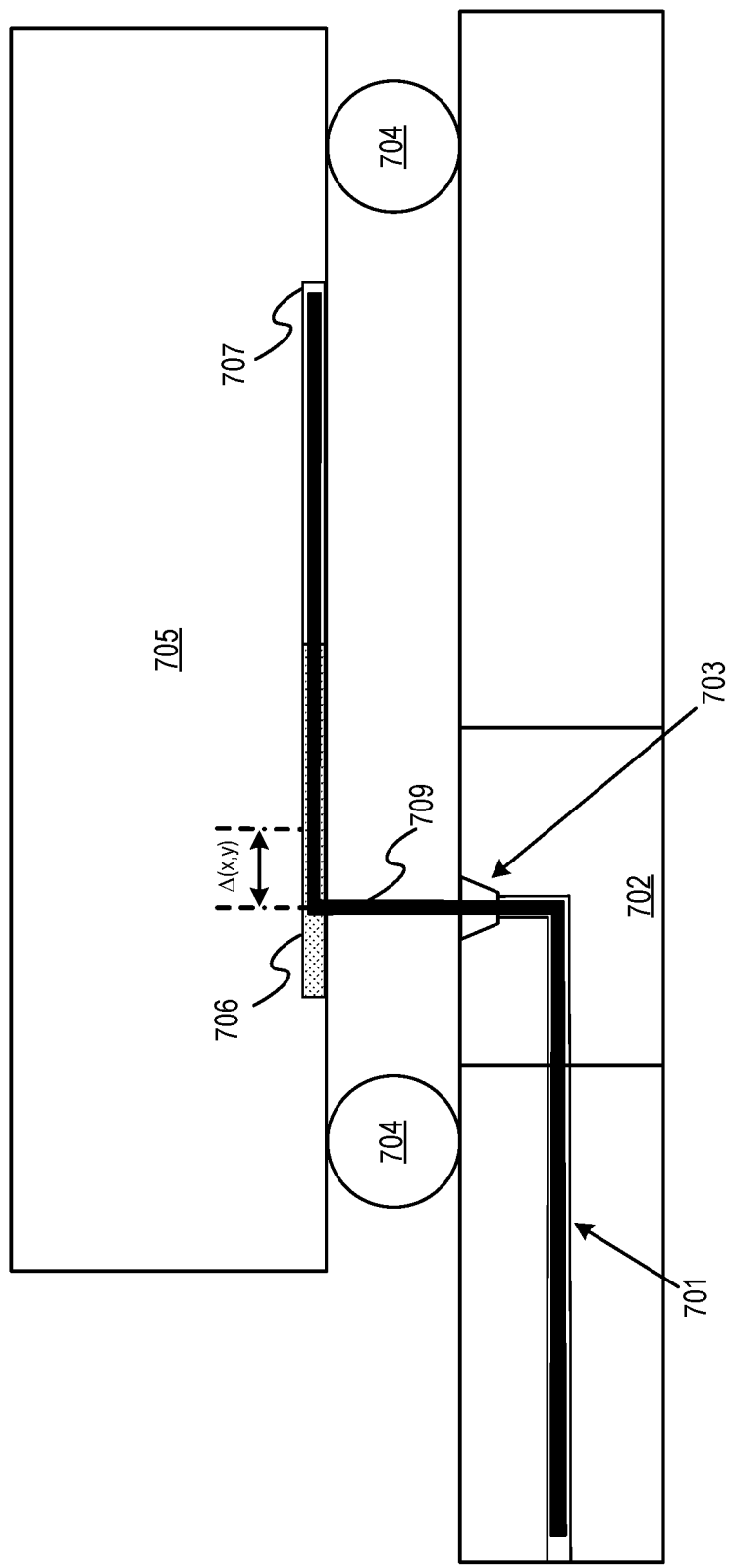

FIGS. 7(a) to 7(c) illustrate an example assembly of a TDW plate interface as incorporated on the PIC as part of the PIC package, in accordance with an example implementation. In FIG. 7(a), the PIC package 705 is initially assembled onto the PIC connector 702 and is bonded with solder balls 704. For the initial assembly, the TDW 706 portion of the PIC package 705 is placed over the VGC 703 of the PIC connector 702 to be aligned later.

In FIG. 7(b), light is transmitted through the waveguide/PIC 707 to the TDW 706. Based on the configuration of the TDW as described in the example implementations herein, light is directed substantially orthogonally 708 to the PIC connector 702 at an (x,y) pixel coordinate(s) within the TDW. The PIC connector 702 is aligned with reflective portions as described with FIG. 6(a) (not illustrated), so that light that does not reach the VGC 703 is reflected off the surface of the PIC connector 702 and received by a photodiode sensor as affixed to the PIC package 705 (not illustrated) as described in FIG. 6(a).

In FIG. 7(c), once the reflected light is measured by the photodiode sensor, the TDW can be adjusted to redirect the light at different (x,y) coordinates based on the measurements from the photodiode sensors. The light is adjusted until it is aligned to the VGC 703. When the light is aligned 709, the light can thereby proceed through the VGC 703 to be redirected accordingly by the waveguide 701 to the POB or otherwise in accordance with the desired implementation.

Figure 8A:
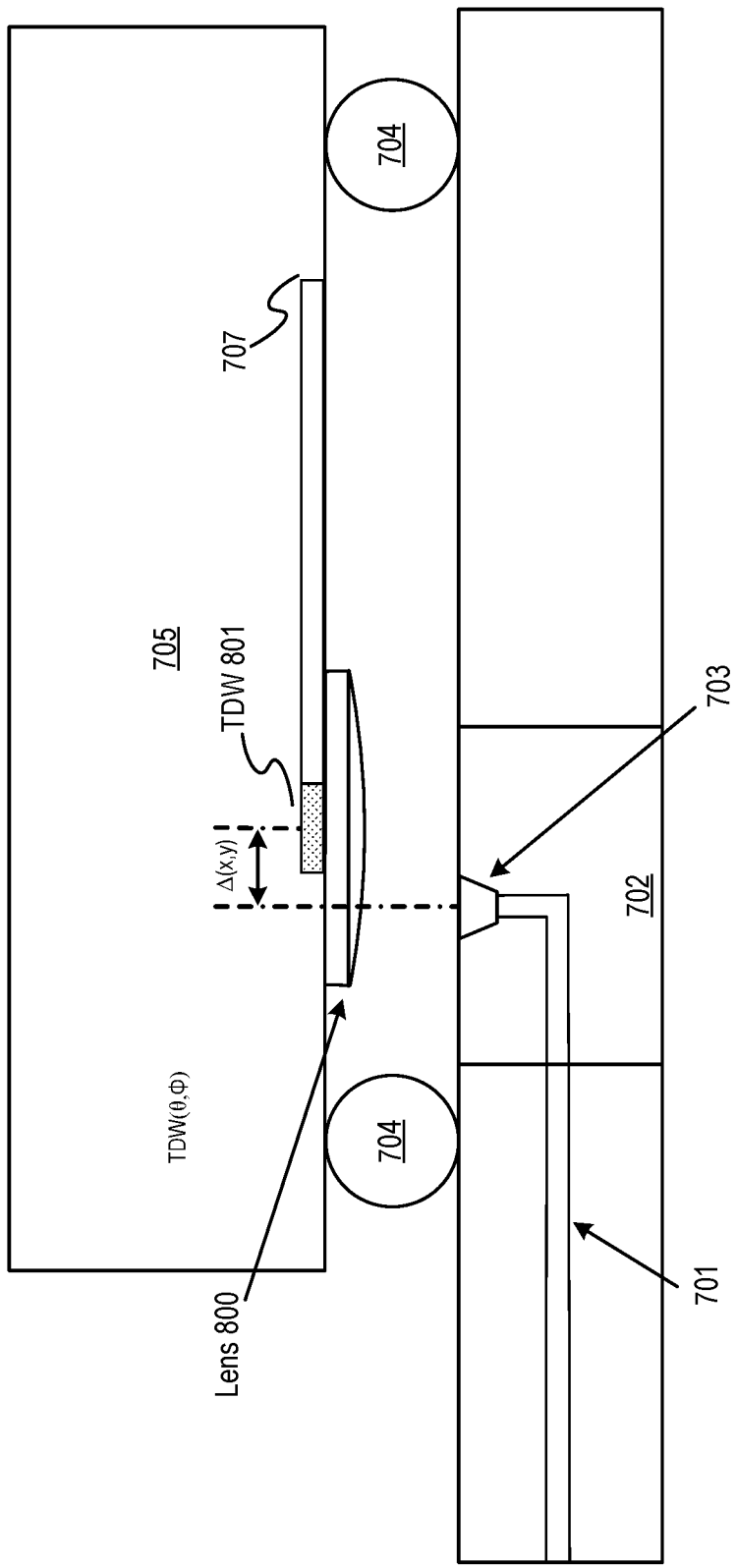
FIGS. 8(a) to 8(c) illustrate an example assembly of an aspheric lens and TDW plate interface as incorporated as part of the PIC package, in accordance with an example implementation.
Figure 8B:
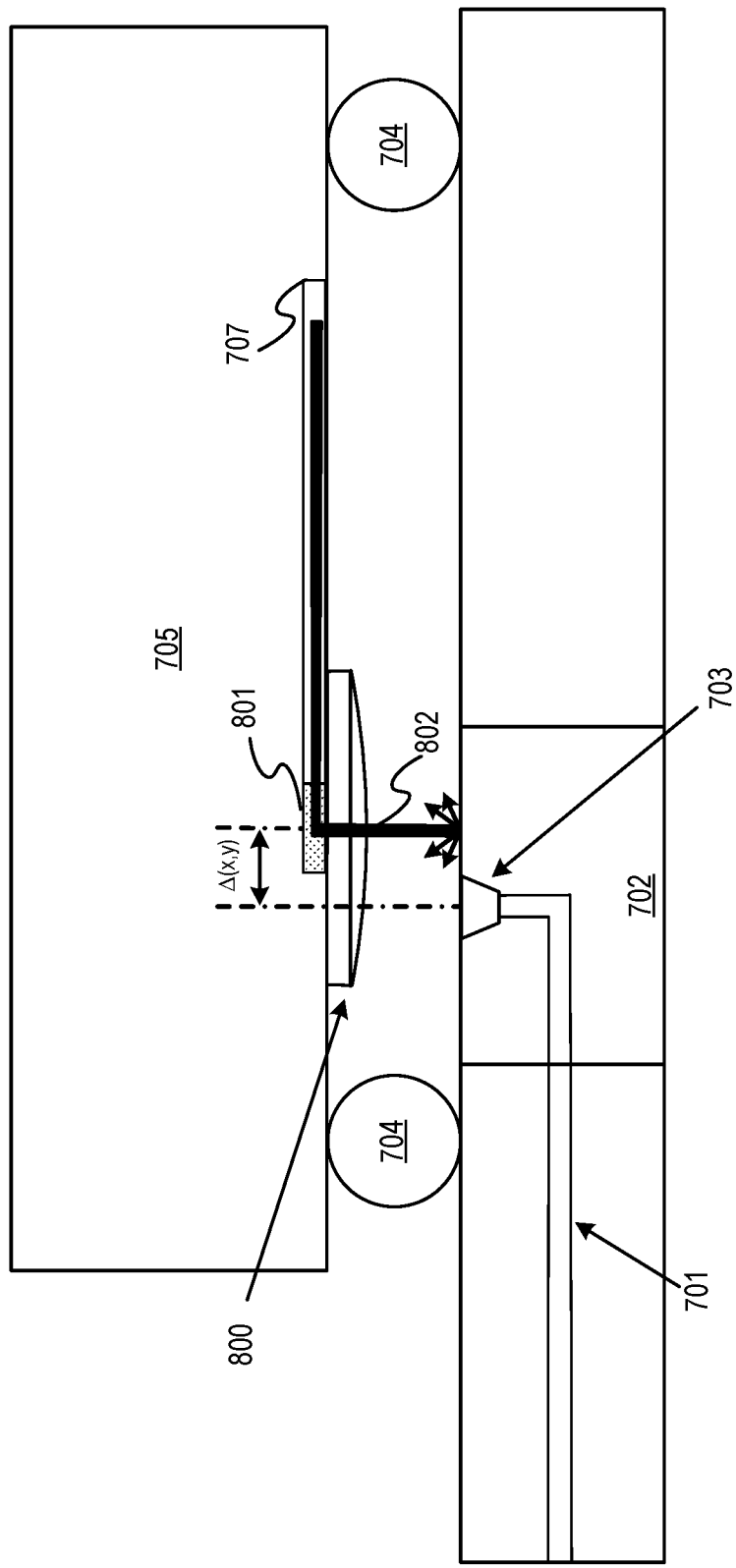
Figure 8C:
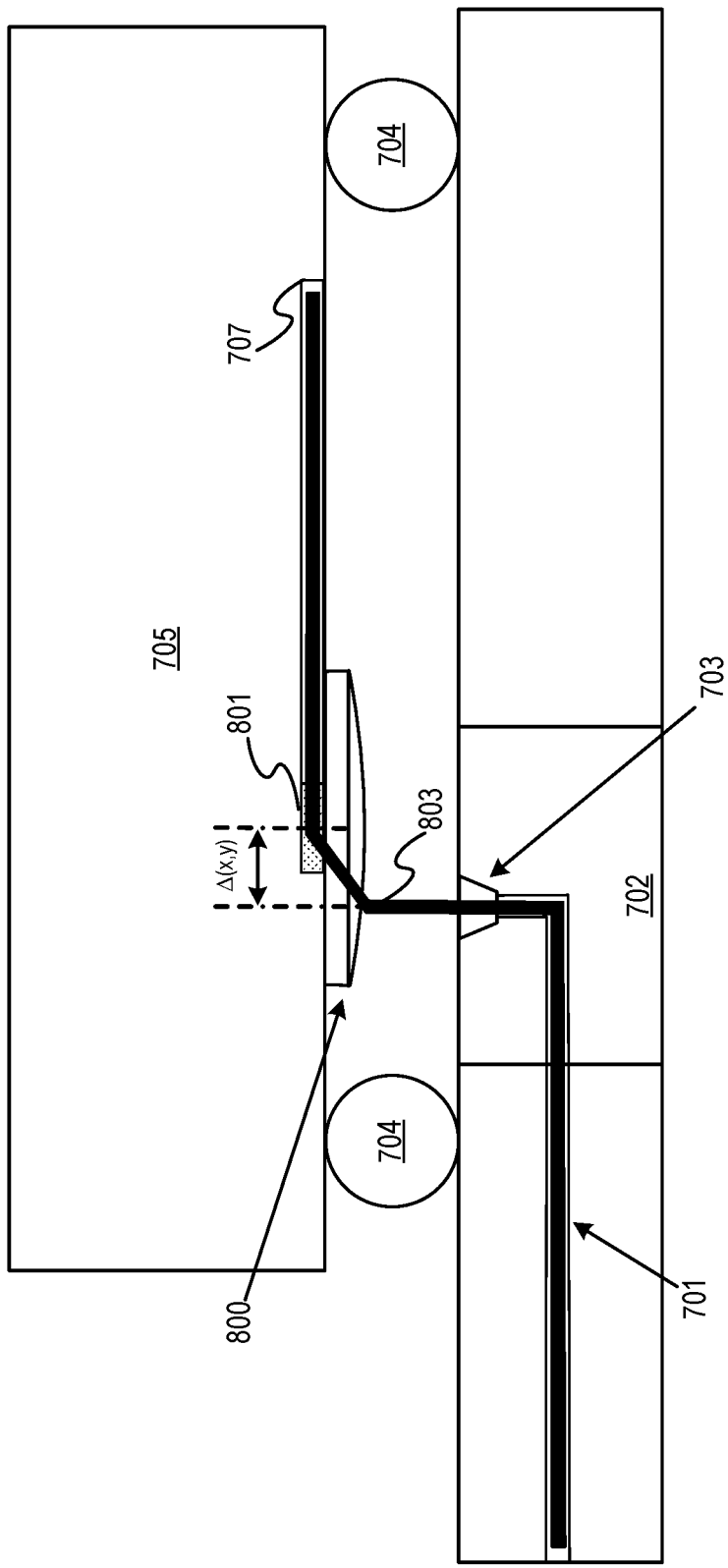

FIGS. 8(a) to 8(c) illustrate an example assembly of an aspheric lens and TDW plate interface as incorporated as part of the PIC package, in accordance with an example implementation. The structure and assembly of FIG. 8(a) is similar to that of FIG. 7(a), only the TDW 801 portion of the PIC package 705 is provided over a location of the lens 800 as opposed to the VGC 703, and the PIC package 705 is positioned such that the lens 800 is positioned over the VGC 703. TDW 801 portion of the PIC package 705 is configured as a coherent optical MIMO to direct light to the lens 800 at an arbitrary angle (θ, φ) direction based on the configuration.

In FIG. 8(b), the implementation is similar to that in FIG. 7(b) in that light that is not absorbed through the VGC 703 is reflected by the reflective portions (not illustrated) of the PIC connector 702, which is measured by the photodiode sensor. Light projected through lens 800 is directed substantially orthogonally towards the PIC connector 702 in the same manner as that of FIG. 7(b), and as shown at 802.

Based on the measurements of the photodiode sensor, the TDW 706 is then driven to transmit the light at another angle towards the lens 800 until the light is aligned 803 as shown in FIG. 8(c).

Figure 9A:
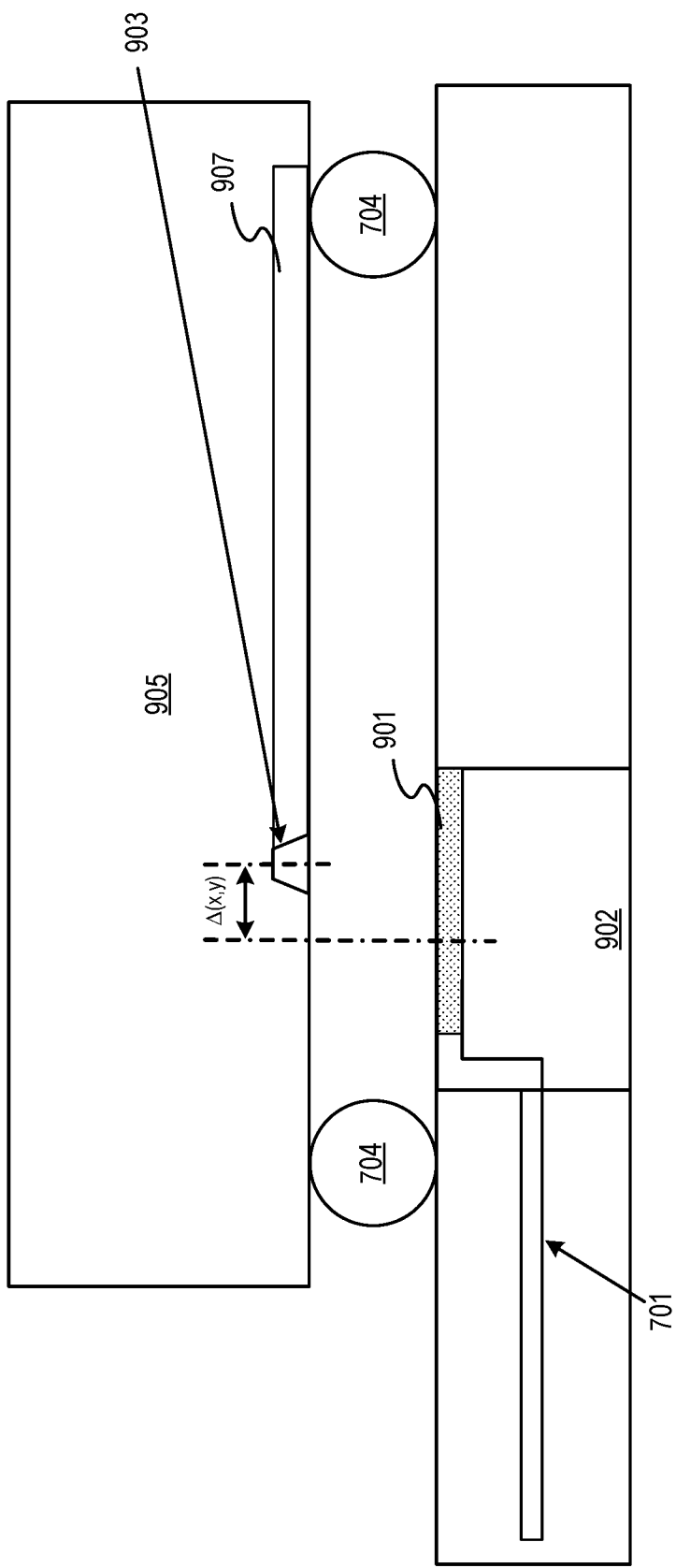
FIGS. 9(a) to 9(c) illustrate an example assembly of a TDW plate interface as incorporated on the connector, in accordance with an example implementation. (Pls. complete the ray lines up to the far end)
Figure 9B:
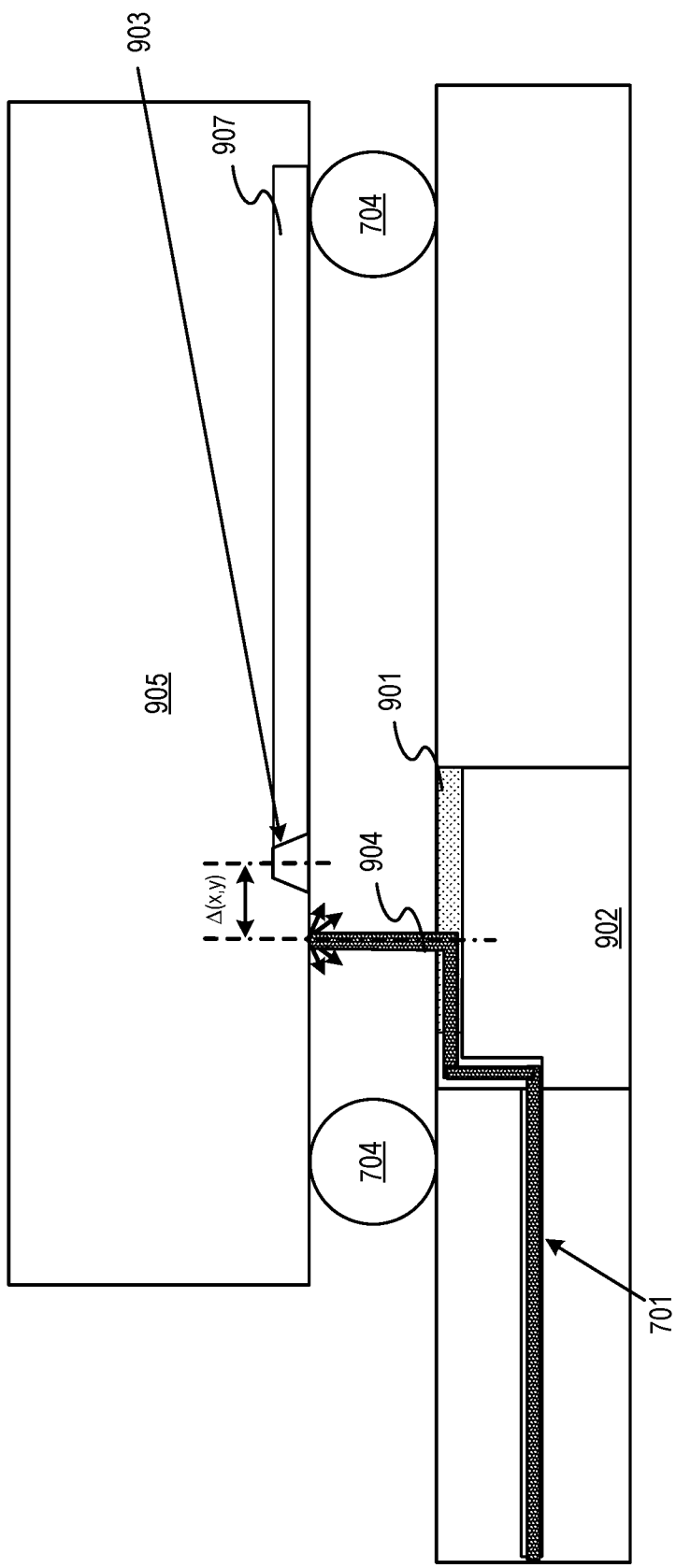
Figure 9C:
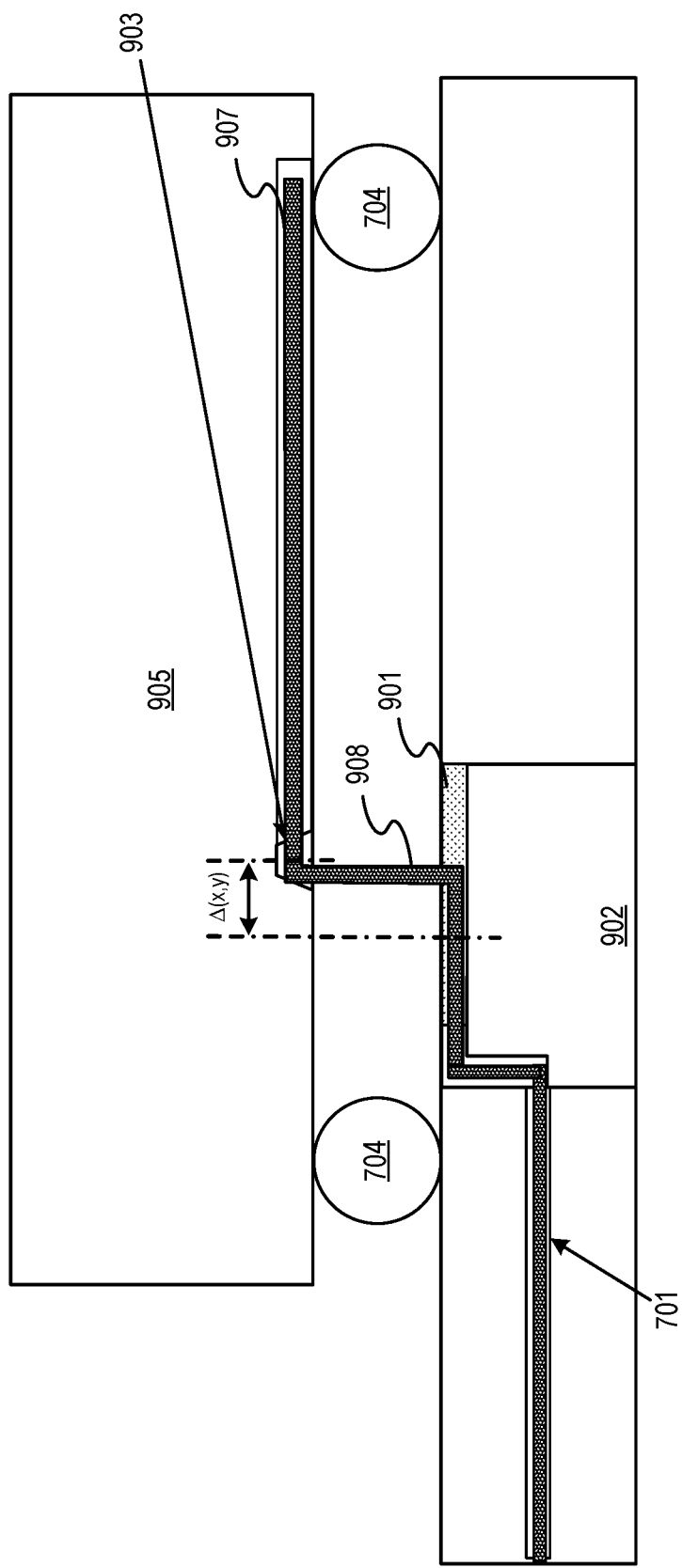

FIGS. 9(a) to 9(c) illustrate an example assembly of a TDW plate interface as incorporated on the connector, in accordance with an example implementation. In the example assembly of FIG. 9(a), the structure is similar to that of FIG. 7(a), only that the PIC connector 902 has a TDW 901 connected to the waveguide 701, and the PIC package 905 has a VGC 903 connected to the waveguide/PIC 907. Light is directed from the waveguide 701 to the TDW 901 to be directed substantially orthogonally towards VGC 903.

As illustrated in FIG. 9(b) and similar to the implementation of FIG. 7(b), light 904 is directed substantially orthogonally towards PIC package 905, which is provided with reflective portions (not illustrated) that reflect light back to a photodiode sensor on the PIC connector 902. Based on the measurements of the photodiode sensor, the TDW 901 is then driven to transmit the light from a different (x,y) pixel coordinate of TDW 901 until the light is aligned 908 as shown in FIG. 9(c).

Figure 10A:
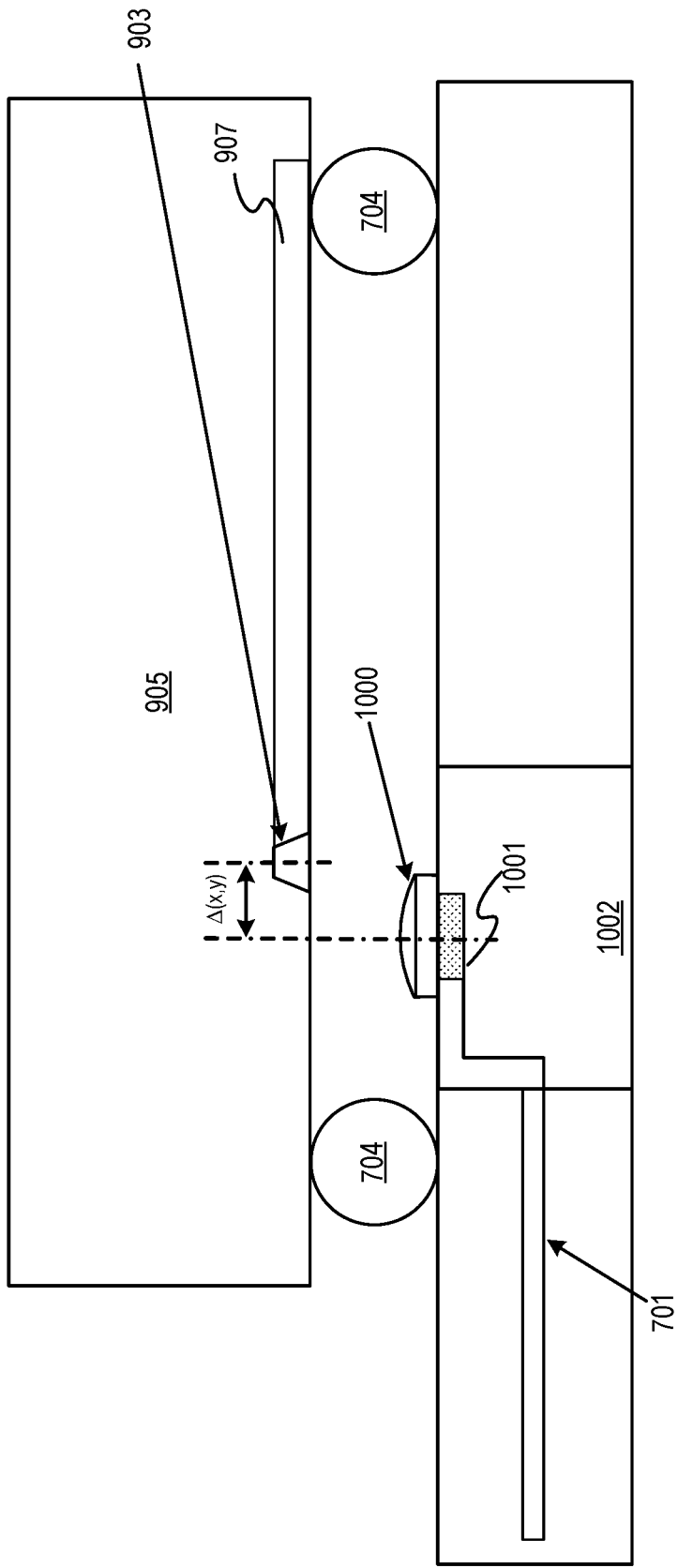
FIGS. 10(a) to 10(c) illustrate an example assembly of an aspheric lens and TDW plate interface as incorporated as incorporated on the connector, in accordance with an example implementation.
Figure 10B:
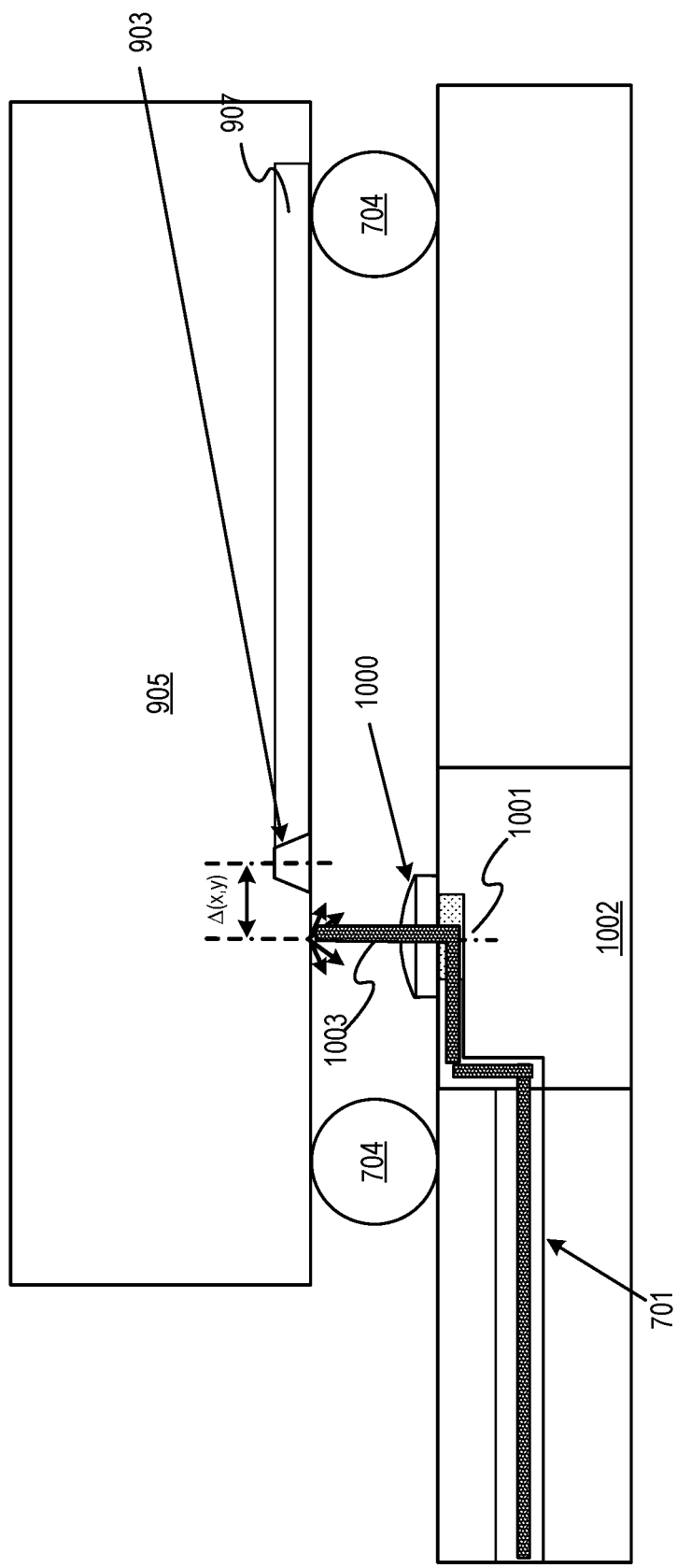
Figure 10C:
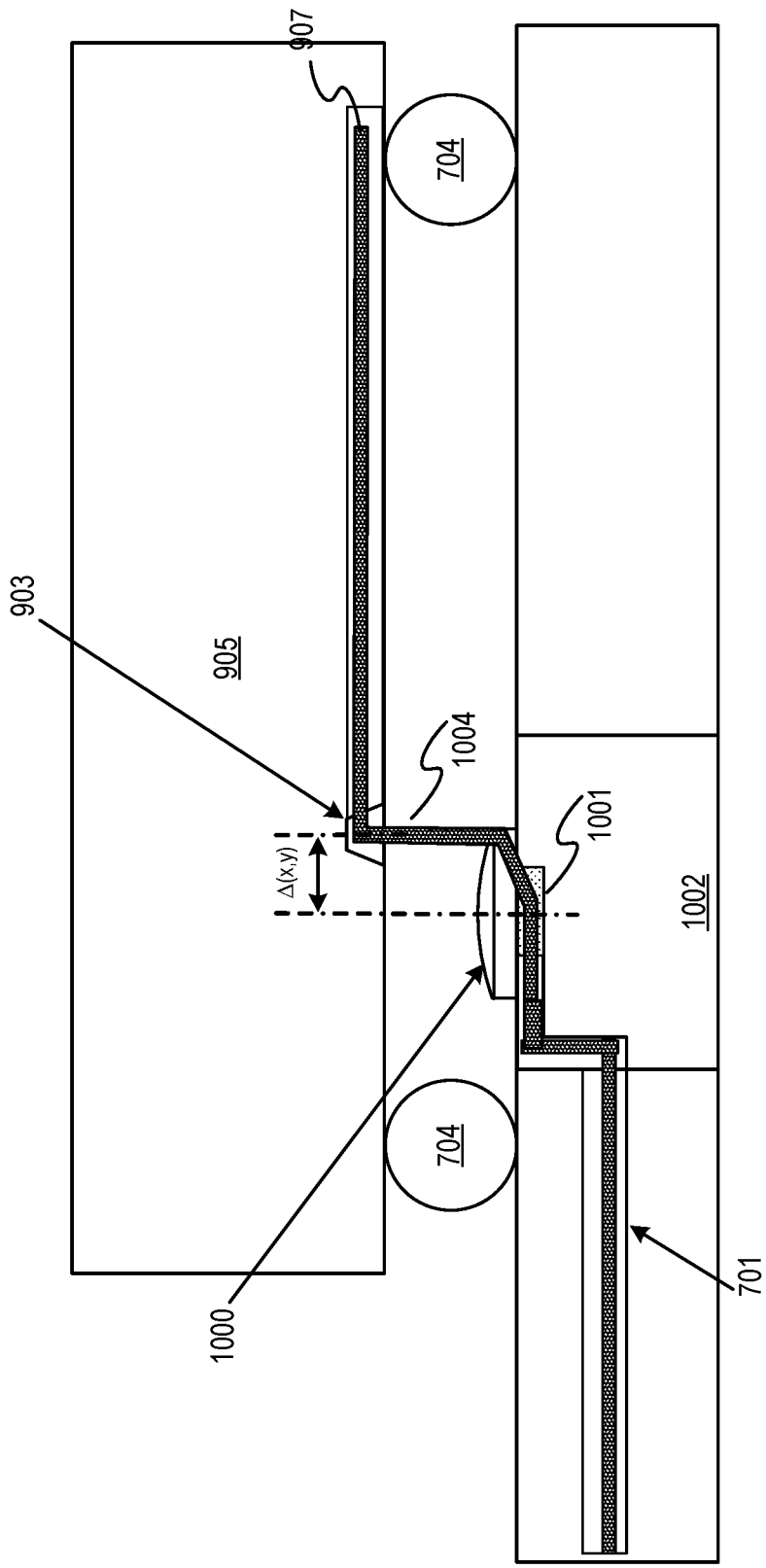

FIGS. 10(a) to 10(c) illustrate an example assembly of an aspheric lens and TDW plate interface as incorporated as incorporated on the connector, in accordance with an example implementation. In the example assembly of FIG. 10(a), the structure is similar to that of FIGS. 8(a) and 9(a), only that the PIC connector 1002 has the coherent optical MIMO TDW 1001 connected to the waveguide 701 as well as the lens 1000. Light is directed from the waveguide 701 to the TDW 1001 to be directed substantially orthogonally towards VGC 903 by lens 1000.

As illustrated in FIG. 10(b) and similar to the implementation of FIG. 8(b), light 1003 is directed form the TDW 1001 to the lens 1000 at an arbitrary angle (θ, φ) direction based on the configuration, whereupon lens 1000 is directed substantially orthogonally towards PIC package 905, which is provided with reflective portions (not illustrated) that reflect light back to a photodiode sensor on the PIC connector 1002. Based on the measurements of the photodiode sensor, the TDW 1001 is then driven to transmit the light from a different angle to the lens 1000 until the light is aligned 1004 as shown in FIG. 10(c).

Thus, FIGS. 7(a), 8(a), 9(a), and 10(a) illustrate example initial completion of assemblies in which the PIC and the connector are misaligned to some degree. FIGS. 7(b), 8(b), 9(b), and 10(b) illustrate executing the alignment process as described with respect to FIGS. 6(a) and 6(b). That is, the TDWs are driven to modify the dielectric constant as described in the example implementations until a final alignment setup is reached as illustrated in FIGS. 7(c), 8(c), 9(c), and 10(c). Once the TDW configuration setup process is complete, the configuration set (with values) is stored and used during the actual operation of any signal directional path (i.e. bidirectional) because of reciprocity. Thus, bidirectional signals can thereby be facilitated through the alignment and assemblies in accordance with the example implementations described herein.

As described herein, the example implementations can involve a system configured to redirect light between a connector connected to a printed optical board (POB) via an optical waveguide and a photonic integrated circuit (PIC) package, the system involving one or more two-dimensionally distributed waveplates (TDWs), each of the one or more TDWs having a plurality of layers of p-doped and n-doped silicon, the one or more TDWs configured to be driven to change a dielectric constant at a two-dimensional location on the one or more TDWs such that the light received at the one or more TDWs is redirected at the two-dimensional location towards a vertical grating coupler. The vertical grating coupler can be disposed either at the connector or the PIC package.

As described herein, the one or more TDWs can be configured to be driven by a change in voltage, an ultrasonic signal, and/or an electro-optic surface plasmon polariton so as to alter the dielectric constant at a desired two-dimensional location on the one or more TDWs. The altering of the dielectric constant can cause the received light to be redirected substantially orthogonally from the TDWs or can be used to form an angled Gaussian beam to be directed towards a lens, in accordance with the desired implementation.

As described herein, the one or more TDWs can be disposed in the connector and connected to the single mode waveguide. In such an example implementation, the one or more TDWs are configured to be driven to change the dielectric constant at the two-dimensional location such that the light received from the single mode waveguide is redirected substantially orthogonally at the two-dimensional location towards the vertical grating coupler disposed in the PIC package. In such an example implementation, one or more photodiode sensors can be disposed on the connector, and positioned to receive light reflected off the PIC package from the redirected light transmitted from the one or more TDWs to determine alignment calibration. Depending on the desired implementation, a waveguide tap monitor having one or more photodiode sensors can be configured to measure the light received by the PIC package so as to determine the maximum signal value once proper alignment is determined.

As described herein, the one or more TDWs can be disposed in the PIC package. In such an example implementation, the one or more TDWs can be configured to be driven to change the dielectric constant at the two-dimensional location such that the light received from the PIC package is redirected substantially orthogonally at the two-dimensional location towards the vertical grating coupler as disposed in the connector. In such an example implementation one or more photodiode sensors can be disposed on the PIC package and positioned to receive light reflected off the connector from the redirected light transmitted from the one or more TDWs to determine alignment calibration. Depending on the desired implementation, a waveguide tap monitor having one or more photodiode sensors can also be used to measure light received by the connector once proper alignment is determined.

As described herein, example implementations can also involve a lens interposed between PIC package and the connector, the lens configured to focus the redirected light from the one or more TDWs towards the vertical grating coupler (either disposed in the connector or in the PIC package); wherein the one or more TDWs are configured to be driven to change the dielectric constant at the two-dimensional location such that the light received at the one or more TDWs are redirected as an angled Gaussian beam at the two-dimensional location towards the lens.

As described herein, the one or more TDWs can be disposed in the connector and connected to the single mode waveguide. In such an example implementation, the one or more TDWs are configured to be driven to change the dielectric constant at the two-dimensional location such that the light received from the single mode waveguide is redirected as the angled Gaussian beam at the two-dimensional location towards the lens, such that the lens redirects the angled Gaussian beam towards the vertical grating coupler disposed in the PIC package so as to be substantially orthogonal from the light received from the single mode waveguide. In such an example implementation, one or more photodiode sensors can be disposed on the connector and positioned to receive light reflected off the PIC package from the redirected light transmitted from the one or more TDWs to determine alignment calibration. Depending on the desired implementation, a waveguide tap monitor having one or more photodiode sensors can be used to measure light received by the PIC package to determine maximum signal value.

As described herein, the one or more TDWs are disposed in the PIC package. In such an example implementation, the one or more TDWs can be configured to be driven to change the dielectric constant at the two-dimensional location such that the light received from the PIC package is redirected as the angled Gaussian beam at the two-dimensional location towards the lens, such that the lens redirects the angled Gaussian beam towards the vertical grating coupler disposed in the connector so as to be substantially orthogonal from the light received from the PIC package. In such an example implementation, one or more photodiode sensors can be disposed on the PIC package and positioned to receive light reflected off the connector from the redirected light transmitted from the one or more TDWs to determine alignment calibration. Depending on the desired implementation, a waveguide tap monitor having one or more photodiode sensors can be configured to measure light received by the connector to determine maximum signal value.

As described herein, the plurality of layers of p-doped and n-doped silicon can be arranged in a checkerboard configuration indicative of possible two-dimensional locations.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system configured to redirect light between a connector connected to a printed optical board (POB) via an optical waveguide and a photonic integrated circuit (PIC) package, the system comprising:
   one or more two-dimensionally distributed waveplates (TDWs), each of the one or more TDWs comprising a plurality of layers of p-doped and n-doped silicon, the one or more TDWs configured to be driven to change a dielectric constant at a two-dimensional location on the one or more TDWs such that the light received at the one or more TDWs is redirected at the two-dimensional location towards a vertical grating coupler.

2. The system of claim 1, wherein the one or more TDWs are configured to be driven by a change in voltage.

3. The system of claim 1, wherein the one or more TDWs are configured to be driven by an ultrasonic signal.

4. The system of claim 1, wherein the one or more TDWs are configured to be driven by an electro-optic surface plasmon polariton.

5. The system of claim 1, wherein the one or more TDWs are disposed in the connector and connected to a single mode waveguide,
   wherein the one or more TDWs are configured to be driven to change the dielectric constant at the two-dimensional location such that the light received from the single mode waveguide is redirected substantially orthogonally at the two-dimensional location towards the vertical grating coupler, and wherein the vertical grating coupler is disposed in the PIC package.

6. The system of claim 5, further comprising one or more photodiode sensors disposed on the connector, wherein the one or more photodiode sensors positioned to receive light reflected off the PIC package from the redirected light transmitted from the one or more TDWs.

7. The system of claim 5, further comprising a waveguide tap monitor comprising one or more photodiode sensors, the waveguide tap monitor being configured to measure light received by the PIC package.

8. The system of claim 1, wherein the one or more TDWs are disposed in the PIC package, wherein the one or more TDWs are configured to be driven to change the dielectric constant at the two-dimensional location such that the light received from the PIC package is redirected substantially orthogonally at the two-dimensional location towards the vertical grating coupler, and wherein the vertical grating coupler is disposed in the connector.

9. The system of claim 8, further comprising one or more photodiode sensors disposed on the PIC package, the one or more photodiode sensors positioned to receive light reflected off the connector from the redirected light transmitted from the one or more TDWs.

10. The system of claim 8, further comprising a waveguide tap monitor comprising one or more photodiode sensors, the waveguide tap monitor configured to measure light received by the connector.

11. The system of claim 1, further comprising:

a lens interposed between PIC package and the connector, the lens configured to focus the redirected light from the one or more TDWs towards the vertical grating coupler, wherein the one or more TDWs are configured to be driven to change the dielectric constant at the two-dimensional location such that the light received at the one or more TDWs are redirected as an angled Gaussian beam at the two-dimensional location towards the lens.

12. The system of claim 11, wherein the one or more TDWs are disposed in the connector and connected to a single mode waveguide, wherein the one or more TDWs are configured to be driven to change the dielectric constant at the two-dimensional location such that the light received from the single mode waveguide is redirected as the angled Gaussian beam at the two-dimensional location towards the lens, such that the lens redirects the angled Gaussian beam towards the vertical grating coupler so as to be substantially orthogonal from the light received from the single mode waveguide, and wherein the vertical grating coupler is disposed in the PIC package.

13. The system of claim 12, further comprising one or more photodiode sensors disposed on the connector, the one or more photodiode sensors positioned to receive light reflected off the PIC package from the redirected light transmitted from the one or more TDWs.

14. The system of claim 12, further comprising a waveguide tap monitor comprising one or more photodiode sensors, the waveguide tap monitor configured to measure light received by the PIC package.

15. The system of claim 11, wherein the one or more TDWs are disposed in the PIC package, wherein the one or more TDWs are configured to be driven to change the dielectric constant at the two-dimensional location such that the light received from the PIC package is redirected as the angled Gaussian beam at the two-dimensional location towards the lens, such that the lens redirects the angled Gaussian beam towards the vertical grating coupler so as to be substantially orthogonal from the light received from the PIC package, and wherein the vertical grating coupler is disposed in the connector.

16. The system of claim 15, further comprising one or more photodiode sensors disposed on the PIC package, the one or more photodiode sensors positioned to receive light reflected off the connector from the redirected light transmitted from the one or more TDWs.

17. The system of claim 12, further comprising a waveguide tap monitor comprising one or more photodiode sensors, the waveguide tap monitor configured to measure light received by the connector.

18. The system of claim 1, wherein the plurality of layers of p-doped and n-doped silicon are arranged in a checkerboard configuration indicative of possible two-dimensional locations.

19. A system, comprising:

a connector configured to be connected to a printed optical board (POB) via an optical waveguide;

a photonic integrated circuit (PIC) package; and one or more two-dimensionally distributed waveplates (TDWs) configured to redirect light between the connector and the PIC package, each of the one or more TDWs comprising a plurality of layers of p-doped and n-doped silicon, the one or more TDWs configured to be driven to change a dielectric constant at a two-dimensional location on the one or more TDWs such that the light received at the one or more TDWs is redirected at the two-dimensional location towards a vertical grating coupler.

* * * * *